Oct. 25, 1966     B. VOUMARD     3,280,423
APPARATUS FOR THE MANUFACTURE OF A FLEXIBLE
TUBE OF THERMOPLASTIC MATERIAL
Filed Feb. 17, 1964
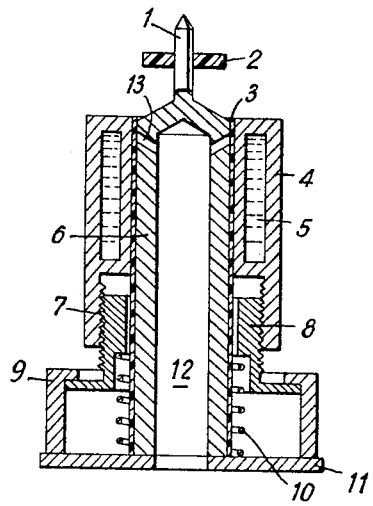
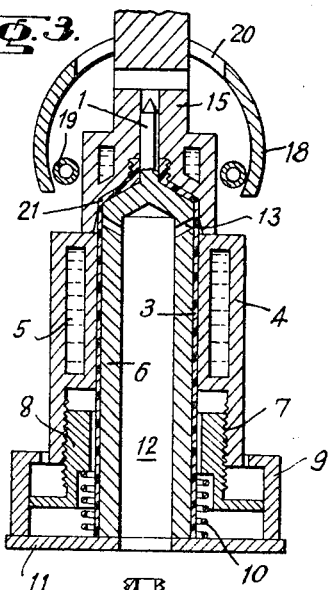
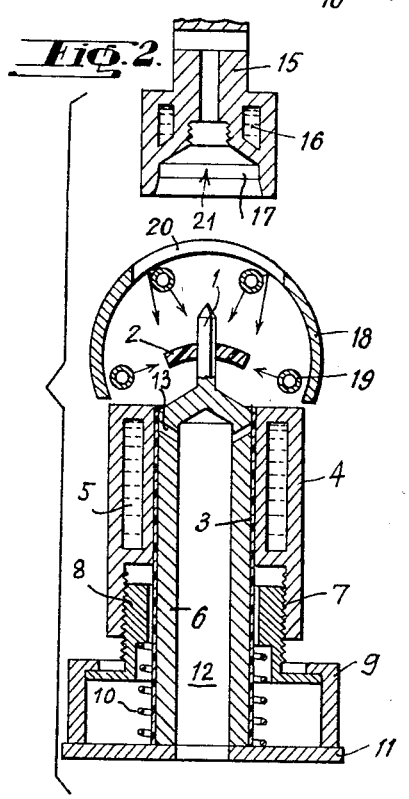
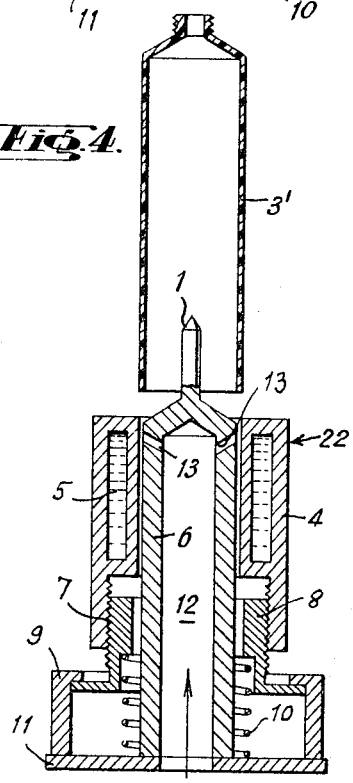
Inventor:
Bertrand Voumard
BY Tab Thein
Agent United States Patent Office 3,280,423
Patented Oct. 25, 1966

3,280,423
APPARATUS FOR THE MANUFACTURE OF A FLEXIBLE TUBE OF THERMOPLASTIC MATERIAL
Bertrand Voumard, 158 Rue Jardinière, La Chaux-de-Fonds, Switzerland
Filed Feb. 17, 1964, Ser. No. 345,438
Claims priority, application Switzerland, Feb. 22, 1963, 2,302/63
5 Claims. (Cl. 18—5)

The present invention relates to an apparatus for the manufacture of a flexible tube of thermoplastic material, having a head at one of its ends, from a tubular blank and a separate mass of the same material. The apparatus includes a core and a cylinder for holding the tubular blank, means for cooling this blank, provided in this cylinder and/or in this core, and a die adapted to be moved towards a punch integral and coaxial with the core, in order to mold the head on the tube and solder it to the latter.

In the industrial manufacture of flexible tubes of thermoplastic material (for example polyethylene, polyvinyl chloride), one encounters a whole series of very serious practical difficulties.

One starts generally with tubular blanks and the problem is to form and mold the head of the tube on one end of this blank. It is a matter of soldering and not merely of heat fusing. No burrs must be produced at the point of soldering. The plastic material must not be chemically altered by excessive local heating.

The present invention aims at completely solving this problem, and it relates to an apparatus of the above-mentioned type. The apparatus is characterized by means for heating on its two faces a thermoplastic disc placed on the said punch, at a distance from one end of the tubular blank, and for simultaneously heating the adjacent end portion of this blank, entirely located within the cylinder before the punch enters into action, these means forming a small oven having an opening for the free passage, after softening of the disc, of the said material, so that the latter molds the heads of the tube within this small oven.

According to the invention, soldering is ensured by the fact that the disc is uniformly heated throughout its mass to the desired softening temperature in order to ensure satisfactory soldering. It is also ensured by the fact that the end of the blank is brought to the same temperature and by the fact that the molding by the punch takes place inside the small oven, thus avoiding any harmful cooling of the blank end and of the disc.

The formation of burrs is avoided, on the one hand, by the fact that, the disc being held at a distance from the blank during its softening, its material tends not to direct itself outwardly (which would favor the formation of burrs), but to draw nearer to the axis of the mold. It is, on the other hand, avoided by the fact that the end of the blank which is heated does not project beyond the cylinder; it arrives at the same level with the end of the cylinder, or even slightly withdrawn from this end, before the die enters into action. Thus, the softened end of the blank being entirely contained between the cylinder and the core before the die enters into action, it has no tendency to flow outwardly.

Any chemical deterioration of the plastic material owing to excessive heating is avoided due to the following dispositions: the disc being heated on its two faces, one reaches the desired temperature very rapidly and without excessive heating localized on only one of its faces, and this uniformly throughout the mass of the disc. The end of the blank being held in contact entirely between the cylinder and the core, which are both cooled, any overheating is prevented.

The invention has the additional advantage of permitting a very rapid rate of manufacture by charging and discharging only one tube at a time.

The accompanying drawing shows, by way of example, one embodiment of the apparatus according to the invention and its operation.

FIG. 1 is a longitudinal section through the inventive apparatus for making flexible tubes, and showing the core with its punch, the tubular blank, the cylinder and the disc, as they are in a first stage of operation;

FIG. 2 shows a similar section with the die and the heating tunnel added, as they are in a second stage of operation;

FIG. 3 is a section similar to that of FIG. 2, but in a third stage of operation; and FIG. 4 is a section like FIG. 3, but without the heating tunnel and the die, showing a fourth stage of operation.

The apparatus includes a base 11 on which is fixed a core 6, having an opening 12 and a group of orifices 13. The upper end 1 of the core 6 constitutes a punch forming the interior of the head of the flexible tube. It is on this core 6 that is placed a tubular blank 3 of thermoplastic material, suitably prepared and cut to the exact length.

The outer wall of this blank 3 is in contact with the inner surface of a cylinder 4 in which is formed a chamber 5 for the circulation of water necessary for the cylinder 4. This cooling prevents any influence of heat on the outer wall of the blank 3. The cylinder 4 is fitted close enough to the tubular blank 3 so as to be able to slide vertically without play, but without entraining the blank 3.

The cylinder 4 is supported on a ring 8 by means of a threaded portion 7 which permits an adjustment of the height of the cylinder 4. The ring 8, urged upwards by a spring 10, abuts against a ring 9 by means of a collar, the ring being rigidly secured to the base 11.

A central opening is formed in ring 8, permitting the free passage, without contact, of the tubular blank 3. This blank is introduced between the core 6 and the cylinder 4 by means not shown, and is pushed downwardly until it abuts the base 11.

On the upper core end 1, one places a pre-shaped disc 2 of the same thermoplastic material as that of the tubular blank 3 so that it remains at a certain distance above the shoulder of the core 6, as shown in FIG. 1.

It is important that blank 3 be placed so that its outer wall is in close contact, throughout its length, with the cylinder 4, without however projecting beyond the latter before a die 15 enters into action, while the inner wall of this blank 3 extends slightly beyond the core shoulder. This in order to permit the softening by heating of the inner portion of this blank 3 above the shoulder of the core 6, in order to facilitate its soldering with the material of the disc 2.

The unit shown in FIG. 1 is placed on a movable table so that it may be displaced and reaches a heating position under a tunnel-shaped oven 18, as schematically shown in FIGS. 2 and 3. This oven has heating elements 19 imparting a radiation to the disc 2 as well as inside the upper part of the tube blank 3. After a definite interval of time, the thermoplastic material softens through the absorption of a certain quantity of heat. The walls of the blank 3 which are in contact with the core 6 and the cylinder 4 remain unchanged.

Above and in the axis of the core 6 is placed the die 15 driven, for example, by a hydraulic device (not shown), and comprising a chamber 16 for conditioning the temperature (through the agency of an extraneous fluid), and a recessed part 17 for the formation of the tube head. This part 17 comprises a gripping zone for the blank 3 as well as a cone and a thread forming the shoulder and the screw thread of the flexible tube. It is obvious that any other form for the tube head may be shaped, for example a flat or a conical head, without thread or without central orifice.

The unit again moves in the oven 18 to place itself in a pressing position. The oven 18 has an opening 20 permitting the passage of the die 15.

In the position shown in FIG. 2, the oven is closed (not shown) at its opening 20. A side extension of the oven has for its object to maintain the heating of the disc 2 during the pressing operation until the die 15 covers this disc 2. The pressing step is carried out by lowering the punch 15 on the core 6. The softened material of the disc 2 is imprisoned in a chamber 21 and, by the pressure exerted on the die 15, it takes the shape of this die and of the core 6.

The cylinder 4 is pushed downwards by the die 15 which caps the blank of the tube blank 3. The die 15 imparts a gripping action to the blank 3 between the walls of the recessed part 17 and of the core 6 in order to avoid that the material compressed in the chamber 21 pushes the tubular blank 3 out of the pressing or die zone 17.

The blank 3 having also been softened at its upper end, as described above, a soldering or through fusion takes place with the material enclosed in the chamber 21. After a definite stabilization and softening period, the completed tube 3' (see FIG. 4) keeps its final form.

The tubular blank 3 having been subjected to a gripping between the core 6 and the die 15 during the pressing step, it is necessary to withdraw upwardly the shaped tube 3' and the die by an amount slightly greater than that of the gripping zone, in order to free the completed tube. Then pressing at 22 on the cylinder 4, the tube 3' is held gripped between the core 6 and the cylinder 4.

By a device not shown, the die 15 is then made to rotate, combined with a rising movement, so as to move it along a spiral path which causes the unscrewing of the tube 3' from the die 15. After complete unscrewing, the die 15 resumes its initial place as shown in FIG. 2.

The complete withdrawal of the tube will be effected by blowing air into the opening 12 and through orifices 13, thus causing an upward thrust of the completed tube 3', whereupon it is collected by a device not shown.

Under the effect of the spring 10, the cylinder 4 follows the rising movement of the die 15 and resumes the starting position as shown in FIG. 1, ready to receive a new tube blank 3 and a new disc 2.

What I claim is:

1. In an apparatus for making flexible, thermoplastic tubes terminating in heads, from a tubular blank and a separate mass of the same thermoplastic material as that of said blank, said apparatus having a core member and a cylinder member substantially concentrically arranged around said core member for holding said blank therebetween, means provided in at least one of said members for cooling said blank, and a die member movable toward a punch integral and coaxial with said core member, for molding said head on said blank and for soldering it to the latter, the improvement comprising means for heating on its two faces a disc consisting of said thermoplastic material placed on said punch at a distance from one end of said blank and for simultaneously heating the adjacent end portion of said blank, located entirely within said cylinder member before said punch is actuated, said heating means forming a small oven having an opening for the free passage of said die member after softening of said disc so that said die member molds said head inside said oven.

2. In an apparatus for making flexible tubes, the improvement according to claim 1, wherein said cylinder member and said core member are movable into said oven opening together with said blank and said disc from a first softening zone for said disc to a second zone below said opening so as to permit pressing simultaneously said blank and said disc.

3. In an apparatus for making flexible tubes, the improvement according to claim 1, wherein said cylinder member is movable axially relative to said core member by a front edge of said die member for introducing said one end of the blank in said die member for soldering said head to this end of said blank.

4. In an apparatus for making flexible tubes, the improvement according to claim 3, further comprising spring means for urging said cylinder member toward said die member.

5. In an apparatus for making flexible tubes, the improvement according to claim 1, further comprising means in said die member for cooling the molded head of the flexible tube.

References Cited by the Examiner
UNITED STATES PATENTS

| | | | |
|---|---|---|---|
| 2,947,035 | 8/1960 | Baker | 18—36 |
| 2,958,898 | 11/1960 | Voumard et al. | 264—323 XR |
| 2,983,959 | 5/1961 | Shapero et al. | |
| 2,994,107 | 8/1961 | Quinche. | |

J. SPENCER OVERHOLSER, *Primary Examiner.*

W. L. McBAY, *Assistant Examiner.*